United States Patent [19]

Kuroshita

[11] Patent Number: 5,887,424
[45] Date of Patent: Mar. 30, 1999

[54] EXHAUST APPARATUS FOR ENGINE

[75] Inventor: Kazuhisa Kuroshita, Inai-Cho, Japan

[73] Assignee: Kawasaki Jukogyo Kabushiki Kaisha, Kobe, Japan

[21] Appl. No.: 731,918

[22] Filed: Oct. 22, 1996

[30]     Foreign Application Priority Data

Apr. 5, 1996  [JP]  Japan .................................. 8-110369

[51] Int. Cl.⁶ .................................................. F01N 3/34
[52] U.S. Cl. ................... 60/293; 60/308; 181/262
[58] Field of Search ........................... 60/293, 299, 308; 181/262; 422/176, 180

[56]             References Cited

U.S. PATENT DOCUMENTS

| | | | |
|---|---|---|---|
| 3,741,730 | 6/1973 | Alcott .................................... | 60/308 X |
| 3,899,303 | 8/1975 | Gaysert ................................. | 60/308 X |
| 4,094,645 | 6/1978 | Bailey ................................... | 60/308 X |
| 4,209,493 | 6/1980 | Olson .................................... | 60/308 X |
| 5,431,013 | 7/1995 | Yamaki et al. ....................... | 60/293 X |
| 5,548,955 | 8/1996 | Sandefur et al. .................... | 60/299 |
| 5,590,522 | 1/1997 | Kynsilehto et al. ................. | 60/308 X |

FOREIGN PATENT DOCUMENTS

| | | |
|---|---|---|
| 50-9615 | 1/1975 | Japan . |
| 6-17646 | 1/1994 | Japan . |
| A-7-19039 | 1/1995 | Japan . |
| 9-158722 | 6/1997 | Japan . |

*Primary Examiner*—Tony M. Argenbright
*Attorney, Agent, or Firm*—Oliff & Berridge, PLC

[57]             ABSTRACT

An exhaust apparatus for an engine is provided, which is capable of efficiently sucking in secondary air for a catalyst by utilizing an ejector (entraining) effect caused by the exhaust gases and which has a simple and inexpensive structure. Exhaust gases from the engine are introduced into a main muffler body, are expanded and muffled by passage through a plurality of silencer chambers, and are also passed through a catalyst and scrubbed thereby in a state in which they are mixed with secondary air introduced from the exterior. A secondary air introduction pipe for introducing secondary air is provided in a first-stage silencer chamber. A mixing pipe is provided into which are introduced the secondary air introduced from the secondary air introduction pipe and the exhaust gases from the first-stage silencer chamber. An ejector (entraining) portion for sucking in the secondary air from the secondary air introduction pipe is formed from an outlet of the secondary air introduction pipe and an inlet of the mixing pipe.

8 Claims, 4 Drawing Sheets

EXHAUST APPARATUS FOR ENGINE

BACKGROUND OF THE INVENTION

1. Technical Field of the Invention

The present invention relates to an exhaust apparatus for an engine. This apparatus accelerates the purifying reaction through a catalyst of exhaust gases from an engine that have been mixed with secondary air from the exterior, so that the exhaust gases are sufficiently purified. In addition the exhaust noise is reduced on output.

2. Related Technical Information

When exhaust gases are emitted from an engine which is being operated at an excessively rich air/fuel ratio, it has long been known to further accelerate the purifying reaction of such exhaust gases by passing them through a catalyst in a state in which they have been mixed with secondary air introduced from the exterior. When this secondary air is supplied to the exhaust system of the engine, means for forcibly increasing the flow velocity by a pump or the like is generally used. Such a means of supplying secondary air, however, must adjust the amount of supplied secondary air in accordance with the amount of emitted exhaust gases, by controlling it by a throttle valve or the like, but such control is comparatively complicated and thus the apparatus becomes larger and more expensive.

To solve this problem, each of Japanese Patent Laid-Open Publication Nos. 6-212964 and 7-19039 disclosed means for automatically introducing secondary air from the exterior, utilizing an ejector (entraining) effect induced by exhaust gases emitted from an engine. Such a secondary air introduction means has an advantage in that the negative pressure generated by the flow of exhaust gases sucks in secondary air from the exterior. This ensures that an amount of secondary air corresponding to the amount of emitted exhaust gases is introduced, so that there is no particular need for means of controlling the amount of secondary air that is introduced, thus simplifying the configuration.

However, the exhaust apparatus of each of these applications utilizes an ejector (entraining) effect using exhaust gases of a flow velocity that has been reduced after they have left a silencer chamber (expansion chamber), and a swirl tube is provided in order to swirl the exhaust gases and increase the flow velocity thereof. This increases the number of components, increasing the cost.

The present invention has the objective of providing an exhaust apparatus for an engine which is capable of using the ejector (entraining) effect of the exhaust gases to suck in secondary air efficiently, but which has a simple and inexpensive structure.

SUMMARY OF THE INVENTION

In order to achieve the above objective, the exhaust apparatus for an engine in accordance with this invention is one in which exhaust gases from an engine are expanded and silenced by the sequential introduction thereof into a plurality of silencer chambers of a main muffler body, and the exhaust gases are purified on passage through a catalyst in a state in which the exhaust gases have been mixed with secondary air introduced from the exterior; wherein the exhaust apparatus for an engine comprises a secondary air introduction pipe for introducing secondary air into a first-stage silencer chamber into which the exhaust gases from the engine are introduced; and a mixing pipe for causing air introduced from the secondary air introduction pipe and exhaust gases within the first-stage silencer chamber to flow from an inlet thereof into a later-stage silencer chamber; whereby an ejector (entraining) portion is formed by the outlet of the secondary air introduction pipe and the inlet of the mixing pipe for sucking secondary air from the secondary air introduction pipe, utilizing an ejector (entraining) effect caused by exhaust gases flowing into the mixing pipe from the inlet thereof.

In the above described exhaust apparatus for an engine, exhaust gases emitted from the engine are introduced into a first-stage silencer chamber within the main muffler body, then flow into a mixing pipe through an inlet thereof. The negative pressure generated by this inward flow of exhaust gases induces an ejector (entraining) effect which sucks secondary air from the exterior through the secondary air introduction pipe and into the mixing pipe. This secondary air is mixed with the exhaust gases in the mixing pipe and is transferred to a later-stage silencer chamber, and the mixture is then passed through a catalyst, is purified thereby, and is emitted.

Since an ejector (entraining) portion is provided within the first-stage silencer chamber where the energy level of the exhaust gases is at the highest within the main muffler body, a large ejector (entraining) effect is obtained thereby and thus there is no particular need to provide means such as a swirler for increasing the flow velocity of the exhaust gases. This effect can be obtained by a simple configuration in which the inlet of the mixing pipe is aligned with the outlet of the secondary air introduction pipe.

In a preferred embodiment of this invention, the inlet of the mixing pipe is formed to have a diameter greater than that of the outlet of the secondary air introduction pipe and is disposed to be substantially coaxial with the outlet. The inlet of the mixing pipe is also set to be in substantially the same plane as the outlet of the secondary air introduction pipe.

This configuration ensures that, when exhaust gases introduced from the engine into the first-stage silencer chamber flow inward through an annular gap formed between the outer peripheral surface of the outlet of the secondary air introduction pipe and the inner peripheral surface of the inlet of the mixing pipe, the flow velocity thereof is increased sufficiently by the constriction imposed by the reduced cross-sectional area and thus the ejector (entraining) effect induced by the exhaust gases is increased. The configuration in which the inlet of the mixing pipe is also disposed substantially coaxially with respect to the outlet of the secondary air introduction pipe ensures that the exhaust gases pass substantially uniformly through the entire annular gap, and thus the exhaust gases flow smoothly into the mixing pipe. If the inlet of the mixing pipe and the outlet of the secondary air introduction pipe are also set to be in substantially the same plane, the location at which the negative pressure is generated in the inlet of the mixing pipe coincides substantially with the outlet of the secondary air introduction pipe, so that the ejector (entraining) effect of the exhaust gases acts reliably on the secondary air introduction pipe and thus the secondary air can be sucked efficiently into the secondary air introduction pipe. The exhaust gases are not hindered by the secondary air introduction pipe, so they flow smoothly into the mixing pipe.

The inlet of the mixing pipe is preferably disposed facing an inner wall surface of the main muffler body, and a gap "a" between the inlet of the mixing pipe and the inner wall surface of the main muffler body and a gap "b" between an outer peripheral surface of the secondary air introduction pipe and an inner peripheral surface of the mixing pipe are set to satisfy the relationship: $b \leq a \leq 10 \times b$.

When exhaust gases introduced into the first-stage silencer chamber from the engine then flow into the mixing pipe through the small gap between the inner wall surface of the main muffler body and the inlet of the mixing pipe, this configuration ensures that the flow velocity thereof is increased by the constriction imposed by the reduced cross-sectional area in front of the inlet of the mixing pipe. Thus the exhaust gases flow smoothly from the inlet of the mixing pipe, further increasing the ejector (entraining) effect.

In another embodiment of this invention, the vicinity of an outlet portion of the mixing pipe is supported by a partitioning wall that separates the first-stage silencer chamber from the later-stage silencer chamber, axially protruding support members are formed in an inlet portion of the mixing pipe, and the protruding end surfaces of the support members are supported by the main muffler body.

This configuration increases the stiffness of the assembly by providing a double-ended support by which an inlet of the mixing pipe is supported on the main muffler body by support members, in addition to the vicinity of the outlet thereof, thus providing stability against vibration and other undesirable effects. Making the length of the support members constant ensures that the inlet can be supported and positioned very accurately at a predetermined spacing from the inner wall surface of the main muffler body. The position of the outlet of the secondary air introduction pipe within the main muffler body is determined by a fixed insertion dimension of the secondary air introduction pipe within the main muffler body, thus enabling highly accurate positioning thereof. Therefore, the relative relationship between the inlet of the mixing pipe and the outlet of the secondary air introduction pipe can be set easily and reliably, and thus the ejector (entraining) effect can be established stably.

In a further embodiment of this invention, a non-return valve is provided in an external end portion of the secondary air introduction pipe to permit the introduction of secondary air from the exterior but prevent any flow of gases from the interior of the secondary air introduction pipe back to the exterior.

In a still further embodiment of this invention, an exhaust chamber is provided for expanding the exhaust gases leaving the catalyst then emitting the exhaust gases from an exhaust port, and an exhaust gas introduction pipe for leading exhaust gases from the engine into the first-stage silencer chamber passes through the exhaust chamber and the later-stage silencer chamber.

This configuration ensures that a comparatively large portion of the exhaust gas introduction pipe is positioned within the main muffler body and thus the portion thereof that is exposed to the exterior is small, so that the entire apparatus can be made more compact.

In an even further embodiment of this invention, the first-stage silencer chamber is provided in a forward portion of the main muffler body, an outlet of the exhaust gas introduction pipe confronting the silencer chamber opens facing a front wall of the main muffler body, and an inlet of the mixing pipe is disposed in close proximity to the front wall.

This configuration ensures that exhaust gases introduced into the first-stage silencer chamber from the exhaust gas introduction pipe strike the front wall of the main muffler body and are deflected thereby so that they flow smoothly into the mixing pipe through the inlet thereof in the vicinity of this front surface.

DETAILED DESCRIPTION OF PREFERRED EMBODIMENTS

Preferred embodiments of the present invention will be described below with reference to the accompanying figures.

Figure 1:
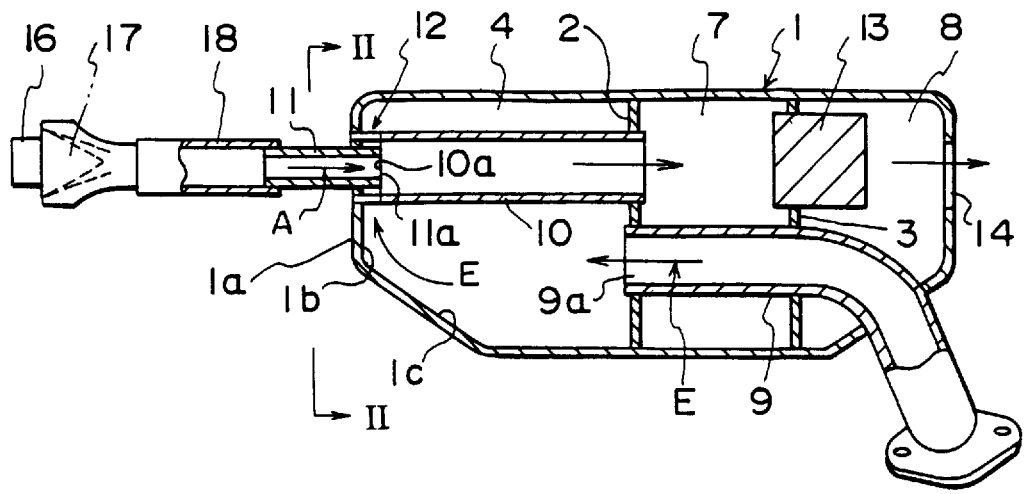
FIG. 1 shows an exhaust apparatus for an engine in accordance with a first embodiment of this invention, wherein a cross-sectional view thereof is illustrated.
Figure 2:
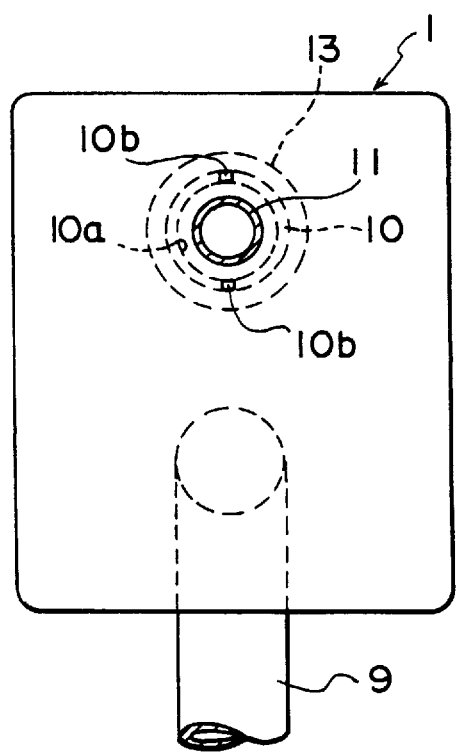
FIG. 2 is a partial enlarged view taken along the line II—II in FIG. 1.
Figure 3:
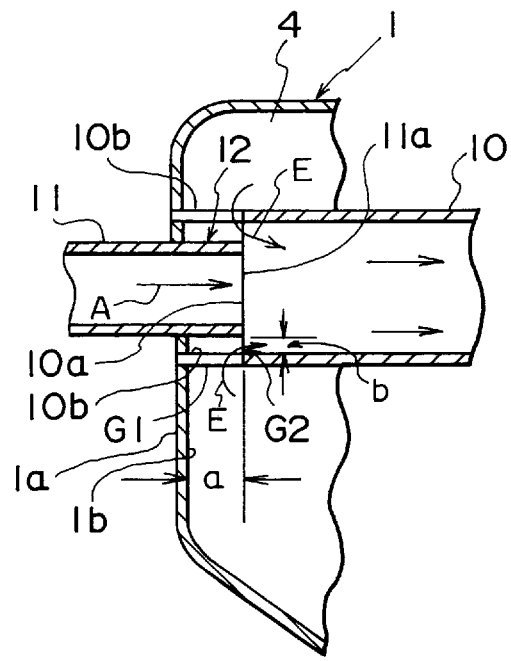
FIG. 3 is an enlarged view of essential portions of FIG. 1.

An exhaust apparatus in accordance with a first embodiment of this invention is shown in FIG. 1 to FIG. 3.

As shown in FIG. 1, the interior of a main muffler body 1 is provided with two partitioning walls 2 and 3 to divide the muffler body into three chambers: a first silencer chamber 4 at the front, a second silencer chamber 7, and an exhaust chamber 8 at the rear. An exhaust gas introduction pipe 9 is attached to a cylinder block of an engine (not shown) and introduces exhaust gases E from the engine into the interior of the first silencer chamber 4. This exhaust gas introduction pipe 9 is disposed in such a manner as to be introduced into the main muffler body 1 from a rear portion thereof (from the right in the figure), passing through the exhaust chamber 8 and the second silencer chamber 7. It is welded to the rear wall of the main muffler body 1 and each of the partitioning walls 2 and 3. This arrangement, by which the exhaust gas introduction pipe 9 passes through the exhaust chamber 8 and the second silencer chamber 7, simply reduces the part of the exhaust gas introduction pipe that is exposed outside of the main muffler body 1 so that the entire apparatus is made compact.

An outlet 9a of the exhaust gas introduction pipe 9 opens forward, facing into the first silencer chamber 4, in other words, it faces a front wall 1a of the main muffler body 1. The inner surface of the portion of the front wall 1a opposite to the outlet 9a is formed as a guide surface 1c at an angle with respect to the exhaust gases E from the outlet 9a.

Figure 4:
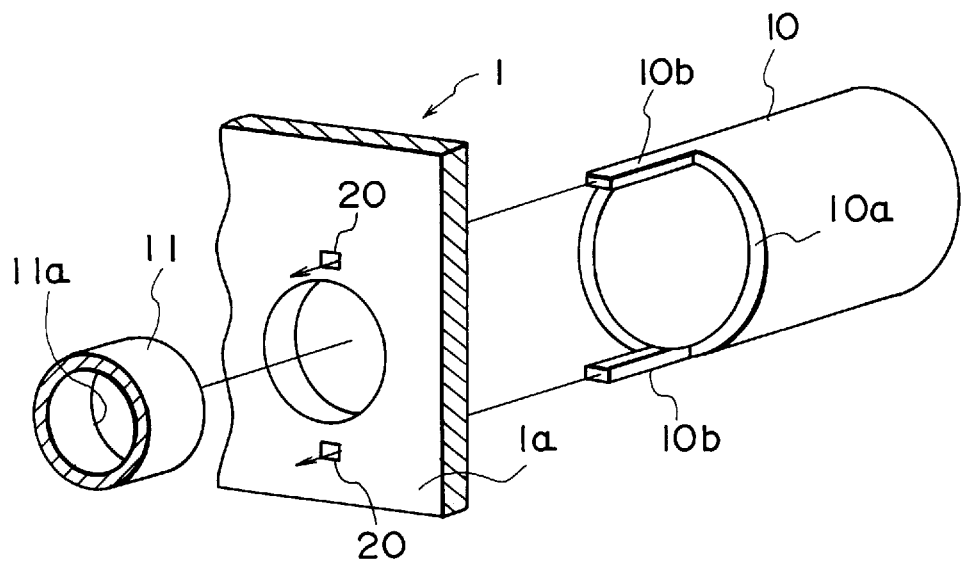
FIG. 4 is a perspective view of essential portions of the first embodiment of this invention.

The first silencer chamber 4 and the second silencer chamber 7 are connected by a straight mixing pipe 10. Two support members 10b are formed integrally with this mixing pipe 10 in such a manner that they protrude axially from locations facing each other across the diametrical direction of an inlet 10a, as shown in FIG. 4. A portion of the mixing pipe 10 in the vicinity of an outlet at a rear end thereof passes through an attachment hole in the partitioning wall 2 and is welded thereto, as shown in FIG. 1. In addition, the protruding end portions of the support member 10b are inserted into fixing holes 20 in the front wall 1a of the main muffler body 1 and are welded thereto to form a double-ended support between the main muffler body 1 and the partitioning wall 2. This holds the mixing pipe 10 stably, even if it subjected to vibration or other undesirable effects. A secondary air introduction pipe 11 for introducing secondary air A from the exterior passes through the front wall 1a of the main muffler body 1 and is welded thereto, so that this secondary air introduction pipe 11 is disposed substantially coaxially with the inlet 10a of the larger-diameter mixing pipe 10, as is clear from FIG. 2. The secondary air introduction pipe 11 is also disposed in such a manner that an outlet 11a thereof is in substantially the same plane as the inlet 10a of the mixing pipe 10, as is clear from FIG. 3. An ejector (entraining) portion 12 is formed by the inlet 10a of the mixing pipe 10 and the outlet 11a of the secondary air introduction pipe 11 which are disposed in this manner.

The inlet 10a of the mixing pipe 10 faces an inner wall surface 1b of the front wall 1a of the main muffler body 1 and it is disposed in close proximity to this inner wall surface 1b. A gap "a" between the inlet 10a and the inner wall surface 1b and a gap "b" between the outer peripheral surface of the secondary air introduction pipe 11 and the inner peripheral surface of the mixing pipe 10 are set to satisfy the relationship: b≦a≦10×b.

Since the protruding end surfaces of the support members 10b of the mixing pipe 10 are positioned in the same plane as the outer surface of the front wall 1a of the main muffler body 1, and are welded thereto, as described above, the gap "a" between the inlet 10a and the inner wall surface 1b can be set accurately to a predetermined value by keeping the length of the support members 10b constant. On the other hand, the outlet 11a of the secondary air introduction pipe 11 can be positioned very accurately by adjusting the depth of insertion of the secondary air introduction pipe 11 within the main muffler body 1. This means that the inlet 10a of the mixing pipe 10 and the outlet 11a of the secondary air introduction pipe 11 can be placed in substantially the same plane in an easy and accurate manner.

The sequence by which the mixing pipe 10 is attached is such that the support members 10b are inserted into fixing holes 20 in a state in which the vicinity of the outlet of the mixing pipe 10 have been inserted into the attachment hole in the partitioning wall 2, the rear end portion is welded to the partitioning wall 2 in a state in which the protruding end surfaces of the support members 10b are positioned in the same plane as the outer surface of the front wall 1a of the main muffler body 1, then the support members 10b are welded to the main muffler body 1.

A catalyst 13 for purifying the exhaust gases is supported in the partitioning wall 3 separating the partitioning wall 2 and the exhaust chamber 8, and an exhaust port 14 opens in the rear wall of the exhaust chamber 8. An air induction pipe 16 having a non-return valve 17 is provided at an outer end portion that forms the inlet of the secondary air introduction pipe 11, with a connecting pipe 18 therebetween. A reed valve is used as the non-return valve 17, which permits secondary air A to enter the secondary air introduction pipe 11 from the exterior but prevents any flow out of the secondary air introduction pipe 11 to the exterior. The mixture of the exhaust gases E and the secondary air A can be prevented by the non-return valve 17 from flowing back out of the secondary air introduction pipe 11 if, for example, the pressure within the main muffler body 1 should rise.

The operation of this exhaust apparatus for an engine will be described next. Exhaust gases E from the engine are introduced into the first silencer chamber 4 through the exhaust gas introduction pipe 9 shown in FIG. 1. Since the outlet 9a of the exhaust gas introduction pipe 9 opens facing the front wall 1a of the main muffler body 1, the exhaust gases E emitted from the exhaust gas introduction pipe 9 strike the front wall 1a and are deflected so that they flow smoothly into the mixing pipe 10 through the inlet 10a thereof, which is positioned in the vicinity of the front wall 1a. In this case, the exhaust gases E are guided towards the inlet 10a of the mixing pipe 10 by the guide surface 1c formed in the front wall 1a, further increasing the smoothness with which they flow inward from the inlet 10a. The exhaust gases E that have flowed into the mixing pipe 10 through an annual gap G2 between the inlet 10a of the mixing pipe 10 and the outlet 11a of the secondary air introduction pipe 11, as shown in FIG. 3, pass through the mixing pipe 10 and enter the second silencer chamber 7 of FIG. 1 where they expand further and the sound thereof is muffled.

There is inevitably some pulsation in the exhaust gases E introduced into the first silencer chamber 4, but this pulsation is suppressed by the expansion of the exhaust gases E by the first silencer chamber 4. Therefore there is substantially no increase in the exhaust gas pressure within the mixing pipe 10 due to such pulsation, which would lead to backflow within the secondary air introduction pipe 11. Even if such backflow does occur within the secondary air introduction pipe 11, it is prevented by the non-return valve 17. Since there is thus substantially no backflow of exhaust gases E within the secondary air introduction pipe 11, the secondary air A is sucked smoothly from the exterior through the secondary air introduction pipe 11.

The exhaust gases E introduced into the first silencer chamber 4 from the exhaust gas introduction pipe 9 have only just been introduced from the engine into the main muffler body 1. Therefore they have simply expanded within the first silencer chamber 4 and thus the energy level thereof is high. When the exhaust gases E pass through a small gap G1 between the inner wall surface 1b of the main muffler body 1 and the mixing pipe 10, as shown in FIG. 3, the flow velocity thereof is increased by the constriction imposed by the reduced cross-sectional area. Furthermore, when the exhaust gases E pass through the annular gap G2 between the outer peripheral surface of outlet 11a of the secondary air introduction pipe 11 and the inner peripheral surface of the inlet 10a of the mixing pipe 10, the flow velocity is increased even more by the further constriction imposed by the smaller cross-sectional area.

This synergistic effect ensures that the exhaust gases E flow into the mixing pipe 10 at a comparatively large flow velocity, without necessitating any complicated means for increasing the flow velocity by swirling the gases, as in the conventional apparatus. As a result, a sufficiently large negative pressure is generated close to the inlet 10a of the mixing pipe 10 by the inward flow of the exhaust gases E, so that secondary air A from the exterior is sucked through the secondary air introduction pipe 11 into the mixing pipe 10 by the ejector (entraining) effect generated by this negative pressure.

Since the inlet 10a of the mixing pipe 10 is disposed substantially coaxially with respect to the outlet 11a of the secondary air introduction pipe 11, the exhaust gases E pass substantially uniformly through the entire annular gap G2 and thus flow smoothly into the mixing pipe 10.

Furthermore, since the inlet 10a of the mixing pipe 10 is set to be in substantially the same plane as the outlet 11a of the secondary air introduction pipe 11, the location at which the negative pressure is generated within the mixing pipe 10 (the inlet 10a of the mixing pipe 10) is as close as possible to the outlet 11a of the secondary air introduction pipe 11, and thus the ejector (entraining) effect of the exhaust gases E acts reliably on the secondary air introduction pipe 11. This makes it possible for the secondary air A to be sucked efficiently into the secondary air introduction pipe 11.

In contrast thereto, if the outlet 11a of the secondary air introduction pipe 11 is inserted in an overlapping manner further into the mixing pipe 10 than the inlet 10a of the mixing pipe 10, the overlapping portion of the secondary air introduction pipe 11 will impede the flow of exhaust gases E into the mixing pipe 10 and thus reduce the ejector (entraining) effect. On the other hand, if there is any space between the inlet 10a of the mixing pipe 10 and the outlet 11a of the secondary air introduction pipe 11, the ejector (entraining) effect due to the exhaust gases E will not act so efficiently on the outlet 11a of the secondary air introduction pipe 11. It should be noted, however, that a certain amount of overlap or space could be permitted between the inlet 10a and the outlet 11a, provided that the ejector (entraining) effect is not greatly reduced thereby.

The secondary air A introduced through the secondary air introduction pipe 11 is mixed with the exhaust gases E within the mixing pipe 10, the mixture passes through the catalyst 13 shown in FIG. 1, and the exhaust gases E are burnt by oxidation reactions within the catalyst 13 to reduce the quantities of hydrocarbons and carbon monoxide therein. The exhaust gases E that have passed through the catalyst 13 and been purified thereby enter the exhaust chamber 8 where they expand then are emitted from the exhaust port 14.

Figure 5:
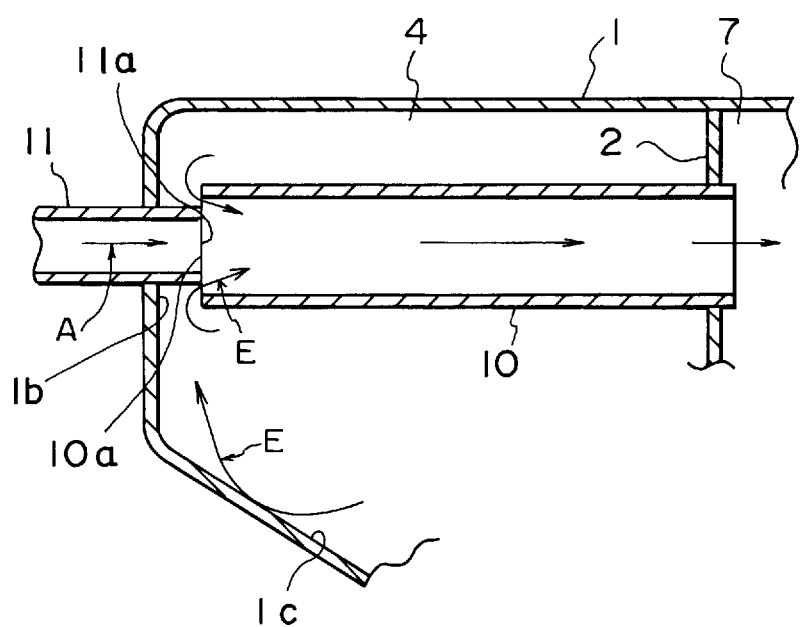
FIG. 5 is a cross-sectional view through essential portions of an exhaust apparatus for an engine in accordance with a second embodiment of this invention.

A second embodiment of this invention is shown in FIG. 5. As shown in this figure, the mixing pipe 10 is not provided with support members 10b, and the vicinity of the outlet of the mixing pipe 10 alone is fixed to the partitioning wall 2 as a single-ended support. In this case too, the mixing pipe 10 is attached in such a manner that the inlet 10a thereof is set in substantially the same plane as the outlet 11a of the secondary air introduction pipe 11. In this second embodiment of the invention, the stiffness of the support of the mixing pipe 10 is slightly reduced, but the same effect as that of the above described first embodiment can still be achieved. In particular, due to the fact that there are none of the support members 10b as shown in FIG. 4, a smoother flow in the portions thereof is generated so that further improvement of the ejector effect can be provided on the previous embodiment.

Figure 6:
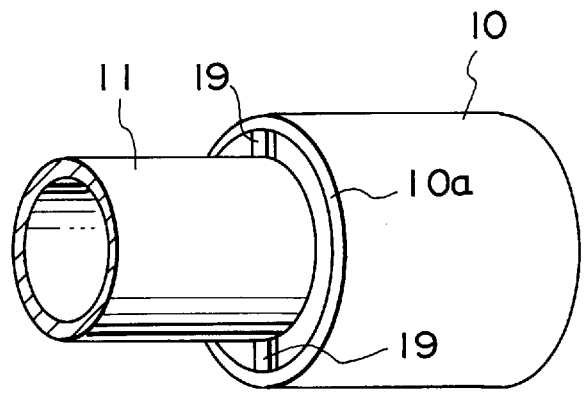
FIG. 6 shows an exhaust apparatus for an engine in accordance with a third embodiment of this invention, wherein a perspective view of essential portions is illustrated.
Figure 7:
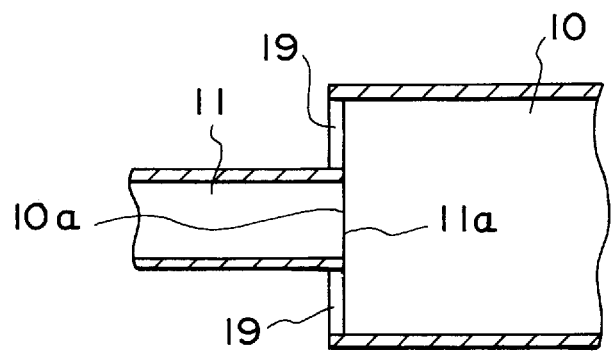
FIG. 7 is a cross-sectional view of those portions.

A third embodiment of this invention is shown in FIG. 6, wherein a perspective view of essential portions is illustrated and FIG. 7 is a cross-sectional view of those portions. In this third embodiment, the inner surface of the inlet 10a of the mixing pipe 10 and the outer surface of the outlet 11a of the secondary air introduction pipe 11 are connected together by two support members 19 which are welded radially therebetween. In this case, the inlet 10a of the mixing pipe 10 and the outlet 11a of the secondary air introduction pipe 11 are in a positional relationship such that they overlap by a small distance equivalent to the thickness of the support members 19 in the axial direction, as shown in FIG. 7. If the degree of overlap between the inlet 10a of the mixing pipe 10 and the outlet 11a of the secondary air introduction pipe 11 is only a small amount equivalent to the thickness of the support members 19, a similar effect to that of the first embodiment can be obtained with virtually no deterioration in the ejector (entraining) effect due to the exhaust gases E, as described previously. The mixing pipe 10 is supported stably because it is supported in a double-ended manner by the partitioning wall 2 and the secondary air introduction pipe 11.

As described above, the exhaust apparatus for an engine in accordance with this invention is provided with an ejector (entraining) portion within the first-stage silencer chamber where the energy level of the exhaust gases is the highest within the main muffler body. This makes it possible to obtain a sufficiently high ejector (entraining) effect from the fast-flowing exhaust gases. There is therefore no need to provide the ejector (entraining) portion with complicated means for increasing the flow velocity of the exhaust gases by a method such as swirling, and a simple and inexpensive structure can be obtained in which the inlet of the mixing pipe and the outlet of the secondary air introduction pipe are simply positioned facing one another.

What is claimed is:

1. An exhaust apparatus for an engine whereby exhaust gases from an engine are expanded and silenced by a sequential introduction thereof into a plurality of silencer chambers of a main muffler body, and whereby said exhaust gases are purified on passage through a catalyst in a state in which said exhaust gases have been mixed with secondary air introduced from the exterior, said exhaust apparatus for an engine comprising:

a secondary air introduction pipe for introducing secondary air into a first-stage silencer chamber into which exhaust gases from said engine are introduced; and a mixing pipe for causing air introduced from said secondary air introduction pipe and exhaust gases within said first-stage silencer chamber to flow from an inlet thereof into a later-stage silencer chamber; whereby an ejector portion is formed by an outlet of said secondary air introduction pipe and an inlet of said mixing pipe for sucking secondary air from said secondary air introduction pipe, utilizing an ejector effect caused by exhaust gases flowing into said mixing pipe from said inlet of said mixing pipe.

2. The exhaust apparatus for an engine of claim 1, wherein said inlet of said mixing pipe is formed to have a diameter greater than that of said outlet of said secondary air introduction pipe and is disposed to be substantially coaxial with said outlet.

3. The exhaust apparatus for an engine of claim 1, wherein said inlet of said mixing pipe is set to be in substantially the same plane as said outlet of said secondary air introduction pipe.

4. The exhaust apparatus for an engine of claim 1, wherein said inlet of said mixing pipe is disposed facing an inner wall surface of said main muffler body, and a gap "a" between said inlet and said inner wall surface and a gap "b" between an outer peripheral surface of said secondary air introduction pipe and an inner peripheral surface of said mixing pipe are set to satisfy the relationship: $b \leq a \leq 10 \times b$.

5. The exhaust apparatus for an engine of claim 1, wherein the vicinity of an outlet of said mixing pipe is supported by a partitioning wall that divides said first-stage silencer chamber from said later-stage silencer chamber, axially protruding support members are formed in an inlet of said mixing pipe, and protruding end surfaces of said support members are supported by said main muffler body.

6. The exhaust apparatus for an engine of claim 1, wherein said exhaust apparatus is further provided with a non-return valve in an external end portion of said secondary air introduction pipe, for permitting the introduction of secondary air from the exterior but preventing any flow of gases from the interior of the secondary air introduction pipe back to the exterior.

7. The exhaust apparatus for an engine of claim 1, wherein said exhaust apparatus is further provided with an exhaust chamber for expanding said exhaust gases leaving said catalyst then emitting said exhaust gases from an exhaust port, and an exhaust gas introduction pipe for leading exhaust gases from the engine into said first-stage silencer chamber passes through said exhaust chamber and said later-stage silencer chamber.

8. The exhaust apparatus for an engine of claim 7, wherein said first-stage silencer chamber is provided in a forward portion of said main muffler body, an outlet of said exhaust gas introduction pipe confronting said silencer chamber opens facing a front wall of said main muffler body, and an inlet of said mixing pipe is disposed in close proximity to said front wall.

* * * * *